(12) United States Patent
Mori

(10) Patent No.: US 11,610,417 B2
(45) Date of Patent: Mar. 21, 2023

(54) IMAGE PROCESSING APPARATUS, CONTROL METHOD THEREOF AND STORAGE MEDIUM

(71) Applicant: CANON KABUSHIKI KAISHA, Tokyo (JP)

(72) Inventor: Namihiro Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 16/983,571

(22) Filed: Aug. 3, 2020

(65) Prior Publication Data

US 2021/0049359 A1 Feb. 18, 2021

(30) Foreign Application Priority Data

Aug. 13, 2019 (JP) .............................. JP2019-148523

(51) Int. Cl.
*G06K 9/00* (2022.01)
*H04N 1/00* (2006.01)
*G06V 30/416* (2022.01)
*G06V 30/412* (2022.01)
*G06V 30/10* (2022.01)

(52) U.S. Cl.
CPC .......... *G06V 30/416* (2022.01); *G06V 30/412* (2022.01); *H04N 1/00244* (2013.01); *H04N 1/00331* (2013.01); *G06V 30/10* (2022.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 11,294,563 B1* | 4/2022 | Epstein | G06F 40/30 |
| 2018/0089835 A1* | 3/2018 | Honda | G06T 7/136 |
| 2019/0005345 A1* | 1/2019 | Uenishi | G06V 10/98 |
| 2020/0106723 A1* | 4/2020 | Nakamura | G06F 16/3329 |
| 2020/0151443 A1* | 5/2020 | Florencio | G06V 30/268 |
| 2020/0177762 A1* | 6/2020 | Segarra, Jr. | G06V 30/12 |
| 2020/0250266 A1* | 8/2020 | Shimizu | G06V 30/416 |
| 2021/0042307 A1* | 2/2021 | Mustafi | G06V 30/416 |
| 2021/0049359 A1* | 2/2021 | Mori | G06V 30/412 |
| 2021/0314460 A1* | 10/2021 | Bacalso | H04N 1/32112 |
| 2021/0409555 A1* | 12/2021 | Yoshihashi | G06F 3/04817 |

FOREIGN PATENT DOCUMENTS

JP 2008-134683 6/2008

* cited by examiner

*Primary Examiner* — Helen Zong
(74) *Attorney, Agent, or Firm* — Venable LLP

(57) ABSTRACT

To make it possible to perform registration by making the same the unit format of a value in a case where the value corresponding to a predetermined keyword within a business form is extracted and registered in a management server or the like. In a case where a value corresponding to a predetermined keyword in accordance with its type is extracted from a business form image, a character string indicating a unit thereof is acquired and after converting the unit into a unit format determined in a registration destination, extraction results are output.

9 Claims, 13 Drawing Sheets

| BUSINESS FORM TYPE | TARGET KEY | DEFAULT UNIT | UNIT VARIATION |
|---|---|---|---|
| BILL | DATE OF ISSUANCE | | |
| BILL | TOTAL | YEN | ¥, JPY |
| MEDICAL EXAMINATION CERTIFICATE | NAME | | |
| MEDICAL EXAMINATION CERTIFICATE | DATE OF EXAMINATION | | |
| MEDICAL EXAMINATION CERTIFICATE | HEIGHT | cm | |
| MEDICAL EXAMINATION CERTIFICATE | WEIGHT | kg | |
| MEDICAL EXAMINATION CERTIFICATE | WHITE COUNT | 1000/μℓ | |
| MEDICAL EXAMINATION CERTIFICATE | RED COUNT | 10000/μℓ | |

FIG.5

| UNIT A | UNIT B | COEFFICIENT |
|---|---|---|
| YEN | THOUSAND YEN | 1000 |
| YEN | TEN THOUSAND YEN | 10000 |
| µℓ | THOUSAND/µℓ | 1000 |
| µℓ | 1000/µℓ | 1000 |
| µℓ | TEN THOUSAND/µℓ | 10000 |
| µℓ | 10000/µℓ | 10000 |

FIG.6

BILL 801

800

BILL NO: 10Z-22-9C
DATE OF ISSUANCE: 2017/8/28  804
802

TO ○○○○○○○ INC.

PAYMENT DEADLINE    2017/9/28
AMOUNT CLAIMED      ¥1,188,000-

| ITEM | UNIT PRICE | QUANTITY | AMOUNT |
|---|---|---|---|
| CONSULTING | 200,000 | 1 | 200,000 |
| SUPPORT | 100,000 | 1 | 100,000 |
| SERVER RENTAL FEE | 400,000 | 2 | 800,000 |

SUB TOTAL         ¥1,100,000
CONSUMPTION TAX      ¥88,000
TOTAL             ¥1,188,000   805
803

TAX RATE 8%

FIG.8

MEDICAL EXAMINATION CERTIFICATE

NAME ○○ ○○
SEX    MALE
DATE OF EXAMINATION   2018/08/25

| ITEM | RESULTS |
|---|---|
| HEIGHT (cm) | 165.8 |
| WEIGHT (kg) | 56.4 |
|  |  |
| WHITE COUNT (THOUSAND/$\mu\ell$) | 7.6 |
| RED COUNT (TEN THOUSAND/$\mu\ell$) | 513 |
|  |  |
| ... | ... |
|  |  |

FIG.10A

PROFIT AND LOSS STATEMENT

○○ INC.

UNIT:THOUSAND YEN

| ITEM | AMOUNT |
|---|---|
| SALES VOLUME | 100,000 |
| GROSS INCOME | 50,000 |
| OPERATING INCOME | 47,000 |
| ORDINARY INCOME | 1,120 |
| INCOME BEFORE INCOME TAXES FOR CURRENT TERM | 1,020 |
| NET INCOME FOR CURRENT TERM | 620 |

FIG.10B

| ID | BUSINESS FORM TYPE | TARGET KEY | EXTRACTION RESULTS (KEY) | EXTRACTION RESULTS (VALUE) | EXTRACTION RESULTS (UNIT) |
|---|---|---|---|---|---|
| 0001-001 | BILL | DATE OF ISSUANCE | DATE OF ISSUANCE | 2017/8/28 | |
| 0001-002 | BILL | TOTAL | TOTAL | 1,188,000 | ¥ |

FIG.11

IMAGE PROCESSING APPARATUS, CONTROL METHOD THEREOF AND STORAGE MEDIUM

BACKGROUND

Field

The present disclosure relates to a technique to extract and register a character string from a business form.

Description of the Related Art

At present, as a device that is used in a case where data on a paper medium, such as a receipt, is digitized and taken in to a PC or the like, an image reading apparatus, such as an imaging scanner and a multi function peripheral, is known. In the image reading apparatus such as this, scan targets are a monochrome document including only characters, a color document, such as a magazine, a developed photo, and the like. As one of information processing systems using the image reading apparatus, there exists an information processing system that extracts a numerical value or the like (value) corresponding to a predetermined item (keyword) from a scanned image and registers it in a management server. As a use case of the system such as this, mention is made of an accounting processing system. By scanning an accounting processing-target business form, such as a bill and a statement of delivery, automatically extracting a character string, such as a date and an amount claimed, which exists within the obtained scanned image, and automatically registering the character string in a management server, it is possible to save time and effort required to manually input a date, an amount claimed and the like. Then, in the world, a variety of types of business form in a variety of formats exist depending on the business types and issuers. Because of this, in the information processing system as described above, in order to deal with a variety of business forms, generally, after specifying and classifying the type and format of a scanned business form, a value corresponding to a registration-target keyword is extracted.

Here, among keywords, not a few of them have a unit, for example, such as an amount in a receipt or a bill, a height and a weight in a certificate of medical examination results. However, the unit has a variety of formats, for example, such as "yen", "thousand yen", and "million yen" in a case of an amount, and such as "µl" and "thousand/m" in a case of a white count, which is one of examination items, and even in the same type of business form, there is a case where a different unit format is adopted for each business form. As regards the item such as that, in a case where a numerical value is extracted and registered without taking into consideration the unit format thereof, on a condition that the unit format is different from that handled on the management server side, an erroneous numerical value is registered as a result. In such a case, it is necessary for a user to correct an erroneous numerical value, resulting in not only an increase in time and effort of a user but also a cause of a mistake. Further, in a case where a value is extracted and registered without taking into consideration a difference in the unit format between business forms even though the business forms are the same type, it becomes difficult to perform the work, such as retrieval, comparison, and totalization, of the registration results. In this regard, Japanese Patent Laid-Open No. 2008-134683 has disclosed a technique to perform conversion so that the unit or the notation format becomes that corresponding to the area of the installation location in a case where the area specified by area information extracted from a canned image of a business form is different from the area of the installation location of the image processing apparatus.

The technique of Japanese Patent Laid-Open No. 2008-134683 described above performs conversion of the unit format in a case where the area indicated by area information obtained from a scanned image of a business form is different from the installation location of the image processing apparatus. Consequently, it is not possible for the technique to deal with a case where a unit format different for each business form is used in the same type of business form used in the same area.

SUMMARY

The image processing apparatus according to the present disclosure is an image processing apparatus that performs an image analysis for a business form image generated by optically reading a business form, and includes: at least one memory that stores a program; and at least one processor that executes the program to perform: extracting, based on results of character recognition processing for the business form image, a character string indicating a value corresponding to a predetermined keyword within the business form and a character string indicating a unit thereof; converting extraction results so as to be adapted to a predetermined format; and outputting the converted extraction results to an external apparatus, and the predetermined format is a format determined in the external apparatus as a format of a unit of a value corresponding to the predetermined keyword.

Further features of the present disclosure will become apparent from the following description of exemplary embodiments with reference to the attached drawings.

BRIEF DESCRIPTION OF THE DRAWINGS

FIG. 5 is a diagram showing a data structure of a key definition table;

FIG. 6 is a diagram showing an example of a conversion table;

FIG. 8 is a diagram showing an example of a business form image;

FIG. 10A is a diagram showing an example of a case where a character string indicating a unit is included within a key area and FIG. 10B is a diagram showing an example of a case where a character string indicating a unit is included within a neighboring area;

FIG. 11 is a diagram showing a data structure of an extraction results table;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1:
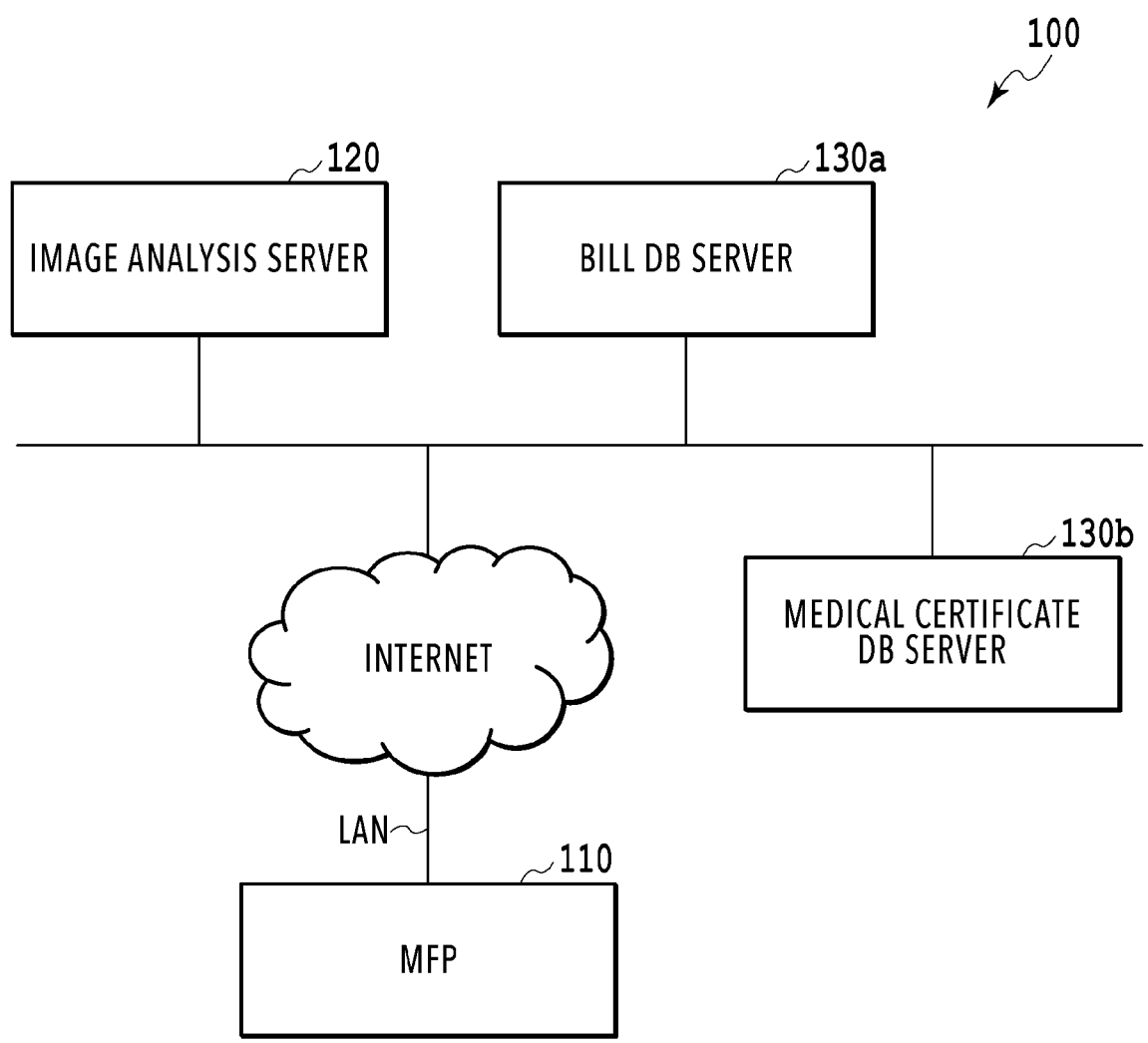
FIG. 1 is a diagram showing a general configuration of an information processing system.

FIG. 1 is a diagram showing the general configuration of an information processing system 100 according to the present embodiment. The information processing system 100 includes an MFP (Multi Function Peripheral) 110 and server apparatuses 120, 130a, and 130b that provide cloud services on the internet. In the following, in a case where an item common to the server apparatus 130a and the server apparatus 130b is explained, the server apparatus 130a and the server apparatus 130b are sometimes described simply as "server apparatus 130". The MFP 110 is connected with the server apparatus 120 and the server apparatus 130 so as to be capable of communication via the internet.

The MFP 110 is an example of the information processing apparatus having the scan function. The MFP 110 is a multi function peripheral having a plurality of functions, such as the printing function and the BOX save function, in addition to the scan function. The server apparatuses 120 and 130 are both an example of the information processing apparatus that provides cloud services. The server apparatus 120 of the present embodiment provides a cloud service to perform predetermined image analysis processing including key/value extraction processing for image data received from an external apparatus, such as the MFP 110. Hereinafter, the server apparatus 120 is called an "image analysis server". The server apparatus 130a provides a cloud service to save/manage data on an already-issued bill. The server apparatus 130b provides a cloud service to save/manage data on a medical examination certificate. Hereinafter, the server apparatus 130a is called a "bill DB server" and the server apparatus 130b is called a "medical certificate DB server".

The configuration of the information processing system 100 shown in FIG. 1 is an example and the configuration is not limited to this. For example, it may also be possible for the MFP 110 to have the function of the image analysis server 120. Further, the image analysis server 120 may be connected with the MFP 110 via a LAN (Local Area Network) or a WAN (Wide Area Network), not on the internet. Further, a plurality of the MFPs 100 or a plurality of server apparatuses may exist, respectively. For example, it may also be possible to prepare a separate management server for each business form used in a variety of fields, such as settlement information on expenditure, such as a receipt, and company's accounting information.

<Hardware Configuration of MFP>

Figure 2:
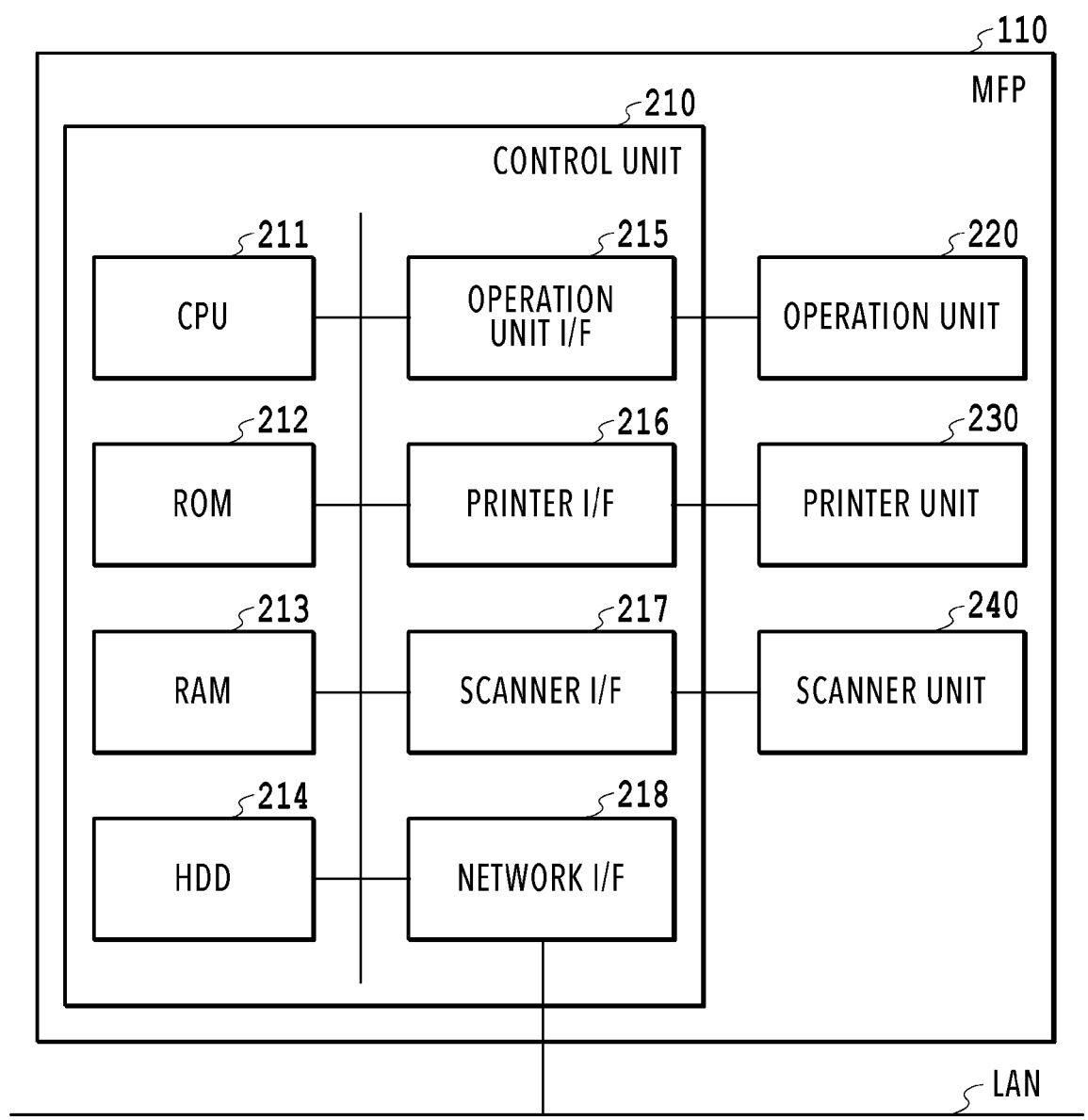
FIG. 2 is a block diagram showing a hardware configuration of an MFP.

FIG. 2 is a block diagram showing the hardware configuration of the MFP 110. The MFP 110 includes a control unit 210, an operation unit 220, a printer unit 230, and a scanner unit 240. The control unit 210 further includes each of units 211 to 218 below and controls the operation of the entire MFP 110. The CPU 211 reads and executes a variety of control programs (programs corresponding to various functions shown in the software configuration diagram, to be described later) stored in the ROM 212. The RAM 213 is used as a temporary storage area, such as a main memory and a work area, of the CPU 211. In the present embodiment, the one CPU 211 performs each piece of processing shown in the flowchart, to be described later, by using one memory (RAM 213 or HDD 214), but the present embodiment is not limited to this. For example, it may also be possible to perform each piece of processing by causing a plurality of CPUs and a plurality of RAMs or HDDs to cooperate with one another. The HDD 214 is a large-capacity storage unit configured to store image data and various programs. The operation unit I/F 215 is an interface that connects the operation unit 220 and the control unit 210. The operation unit 220 comprises a touch panel and a hard key and receives operations/inputs/instructions by a user. The printer I/F 216 is an interface that connects the printer unit 230 and the control unit 210. Image data for printing is transferred from the control unit 210 to the printer unit 230 via the printer I/F 216 and printed on a printing medium, such as paper. The scanner I/F 217 is an interface that connects the scanner unit 240 and the control unit 210. The scanner unit 240 inputs an image (scanned image) obtained by optically reading a document set on a document table or an ADF (Auto Document Feeder), not shown schematically, to the control unit 210 via the scanner I/F 217. It is possible to print the data on the scanned image generated in the scanner unit 240 in the printer unit 230 (copy output), save in the HDD 214, transmit to an external apparatus via a LAN, and so on. The network I/F 218 is an interface that connects the control unit 210 (MFP 110) to a LAN. The MFP 110 transmits the scanned image data to the image analysis server 120, receives various kinds of data from the image analysis server 120 and so on, by using the network I/F 218. The hardware configuration of the MFP 110 explained above is an example and the hardware configuration may comprise another configuration as needed or may not have a part of the configuration.

<Hardware Configuration of Server Apparatus>

Figure 3:
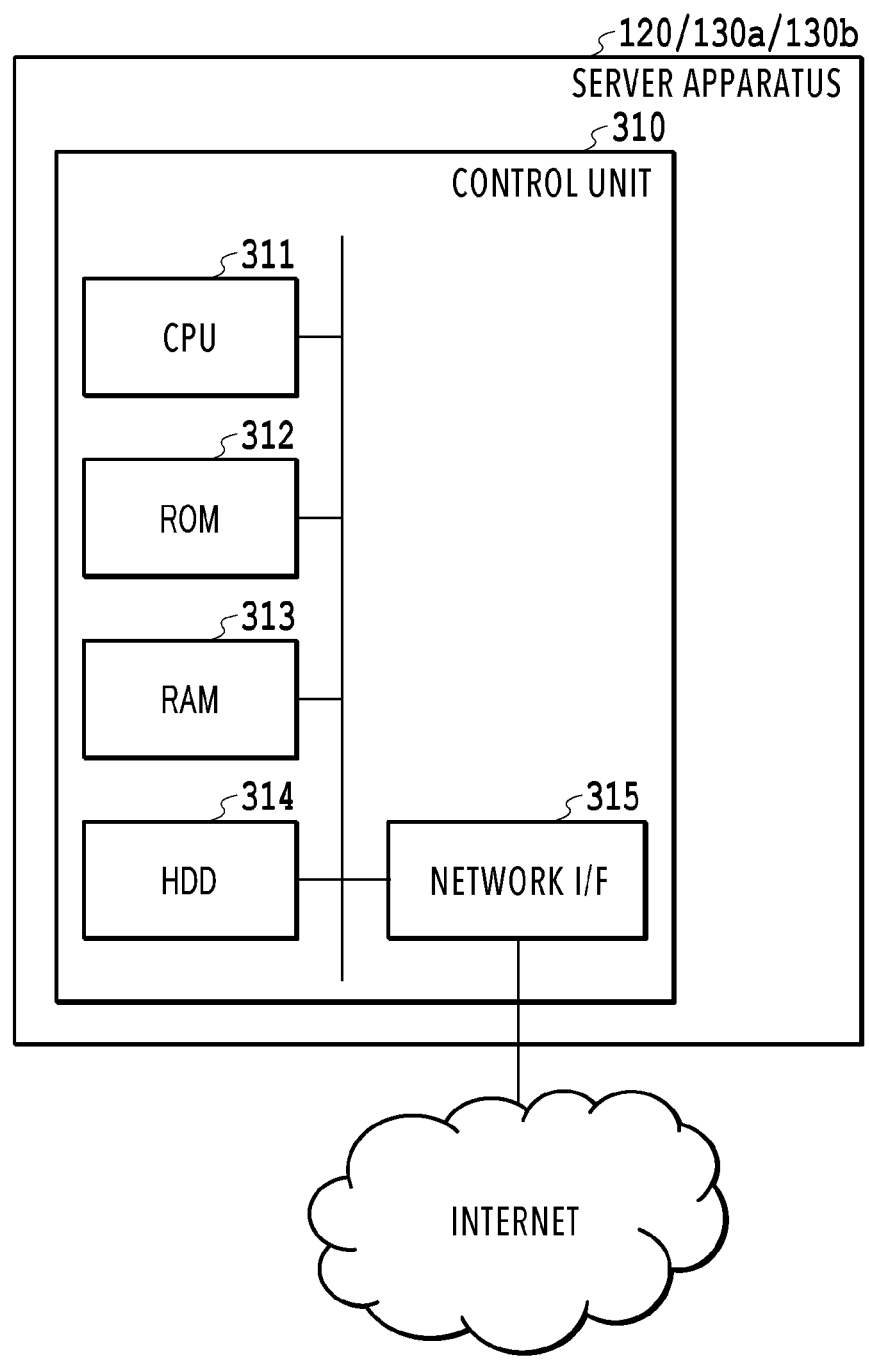
FIG. 3 is a block diagram showing a hardware configuration of a server apparatus.

FIG. 3 is the block diagram showing the hardware configuration of the image analysis server 120, the bill DB server 130a, and the medical certificate DB server 130b. The image analysis server 120, the bill DB server 130a, and the medical certificate DB server 130b have the common hardware configuration and include a CPU 311, a ROM 312, a RAM 313, an HDD 314, and a network I/F 315. The CPU 311 controls the entire operation by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects the control unit 310 to the internet. The image analysis server 120, the bill DB server 130a, and the medical certificate DB server 130b receive a predetermined request from another apparatus (MFP 110 and the like) via the network I/F 315 and perform processing in accordance with the request.

<Details of Image Analysis Server>

Figure 4:
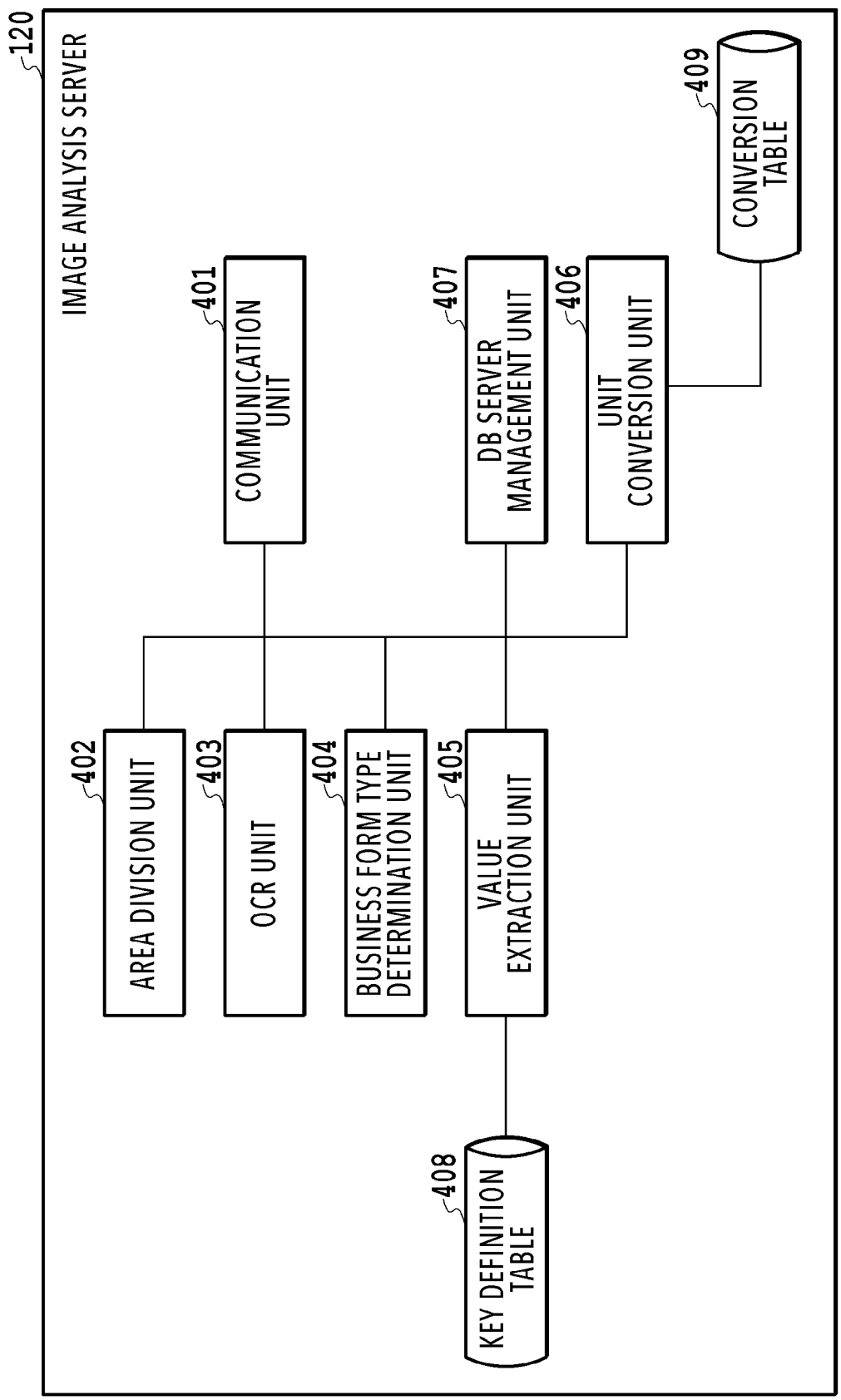
FIG. 4 is a block diagram showing a functional configuration of an image analysis server.

FIG. 4 is a block diagram showing the functional configuration of the image analysis server 120 according to the present embodiment. In the following, along FIG. 4, a series of processing from reception of a scanned image of a business form from the MFP 110 until the results of key/value extraction processing for the scanned image are registered in the bill DB server 130a or the medical certificate DB server 130b is explained.

The image analysis server 120 has each function unit, that is, a communication unit 401, an area division unit 402, an OCR unit 403, a business form type determination unit 404, a value extraction unit 405, a unit conversion unit 406, and a DB server management unit 407.

The communication unit 401 performs transmission and reception of various kinds of data and commands with an external apparatus by using the network I/F 315. Specifically, the communication unit 401 receives data on a scanned image of a business form (hereinafter, called "business form image") from the MFP 110 along with a request for analysis thereof, transmits the results of key/value extraction processing to the bill DB server 130a or the medical certificate DB server 130b along with a request for registration, and so on.

The area division unit 402 performs processing to divide a business form image into areas in units of objects. In this case, on a condition that a table object exists within the business form image, processing to further divide the inside thereof into smaller units, specifically, into units, such as columns, rows, and cells, is performed. Based on the results of this area division, each piece of processing in the OCR unit 403, the business form type determination unit 404, and the value extraction unit 405 is performed.

The OCR (Optical Character Recognition) unit 403 performs character recognition processing for the business form image based on the results of the area division and recognizes characters included within the business form image in units of predetermined areas.

The business form type determination unit 404 performs processing (hereinafter, called "type determination processing") to determine the type of the scanned business form based on the character recognition results by the OCR unit 403. In this type determination processing, in a case where a predetermined condition is satisfied, such as that the font size of a character string included in a predetermined area (for example, at the top of a business form image) that seems to be an area in which a title is described is larger than or equal to a threshold value, the type of the business form is determined by specifying that the character string indicates the type of the business form. Although the item (keyword) that is the target of extraction/registration is different for each business form type, the keyword in the processing-target business form image is determined in accordance with the business form type specified by this type determination processing.

The value extraction unit 405 performs processing to extract a character string, such as a numerical value (value), corresponding to a predetermined keyword within a business form from the business form image in pairs (Key-Value). The "character string" referred to here also includes figures and symbols. The extraction-target keyword (hereinafter, simply called "key") is defined for each business form type and managed in a key definition table 408. FIG. 5 shows the data structure of the key definition table 408 in the present embodiment and the data structure includes four columns of "Business form type", "Target key", "Default unit", and "Unit variation". In "Business form type", a character string indicating the business form type is stored, and here, "Bill" and "Medical examination certificate" are stored, respectively. In "Target key", a character string indicating the extraction-target item is stored in association with the character string indicating the business form type. Here, for "Bill", "Date of issuance" and "Total" are stored and for "Medical examination certificate", "Name", "Date of examination", "Height", "Weight", "White count", and "Red count" are stored. Further, in a case where the key that is defined as described above has a unit, the value extraction unit 405 also extracts a character string corresponding to the unit from the business form image. In "Default unit", a default value in a case where a unit exists for a key defined in "Target key" is stored. In the example in FIG. 5, as the unit of "Total", "yen", as the unit of "Height", "cm", as the unit of "Weight", "kg", as the unit of "White count", "1000/µl", and as the unit of "Red count", "10000/µl" are stored. Then, in "Unit variation", information on a character string that is substantially equivalent to the character string defined in "Default unit" is stored. In the example in FIG. 5, as a character string equivalent to "yen", "¥" and "JPY" are stored. In this case, "¥" is a symbol indicating Japanese yen and "JPY" is the international standard currency code of "yen".

The unit conversion unit 406 performs processing to convert the character string of the value and the character string of its unit, which are extracted from the business form image, so as to match with the unit format that the server apparatus of the registration destination can handle. For this conversion, for example, a conversion table shown in FIG. 6 is used. The conversion table in FIG. 6 includes three columns of "Unit A", "Unit B", and "Coefficient". In "Unit A", the fundamental unit format is shown and in "Unit B", the derivative of the fundamental unit format is shown. "Coefficient" is a coefficient that is applied at the time of conversion between "Unit A" and "Unit B". Each row in the conversion table indicates the combination at the time of conversion and indicates that, for example, by multiplying "yen" specified in "Unit A" by the value "1000" in "Coefficient" in the same row, it is possible to convert "yen" into "thousand yen" specified in "Unit B" in the same row. On the contrary, in a case where "Unit B" is converted into "Unit A", division by the value in "Coefficient" in the same row is performed.

The DB server management unit 407 manages the server apparatus 130. Specifically, the DB server management unit 407 manages the list of the server apparatus 130 (in the present embodiment, the bill DB server 130a and the medical certificate DB server 130b) connected to the image analysis server 120. Further, the DB server management unit 407 performs processing to acquire the status from the specific server apparatus 130, transmit the results of the key/value extraction processing by the value extraction unit 405 to the specific server apparatus 130 along with its registration request, and so on.

It may also be possible for another apparatus to have a part or the whole of the above-described configuration possessed by the image analysis server 120. For example, it may also be possible to design a system configuration in which the MFP 110 mounts a part or the whole of the above-described configuration and also has the function of the image analysis server 120. Further, it may also be possible to distribute the above-described configuration possessed by the image analysis server 120 to a plurality of apparatuses. In any of the system configurations, it is possible to implement the present embodiment.

<Details of Business Form Image Analysis Processing>

Figure 7:
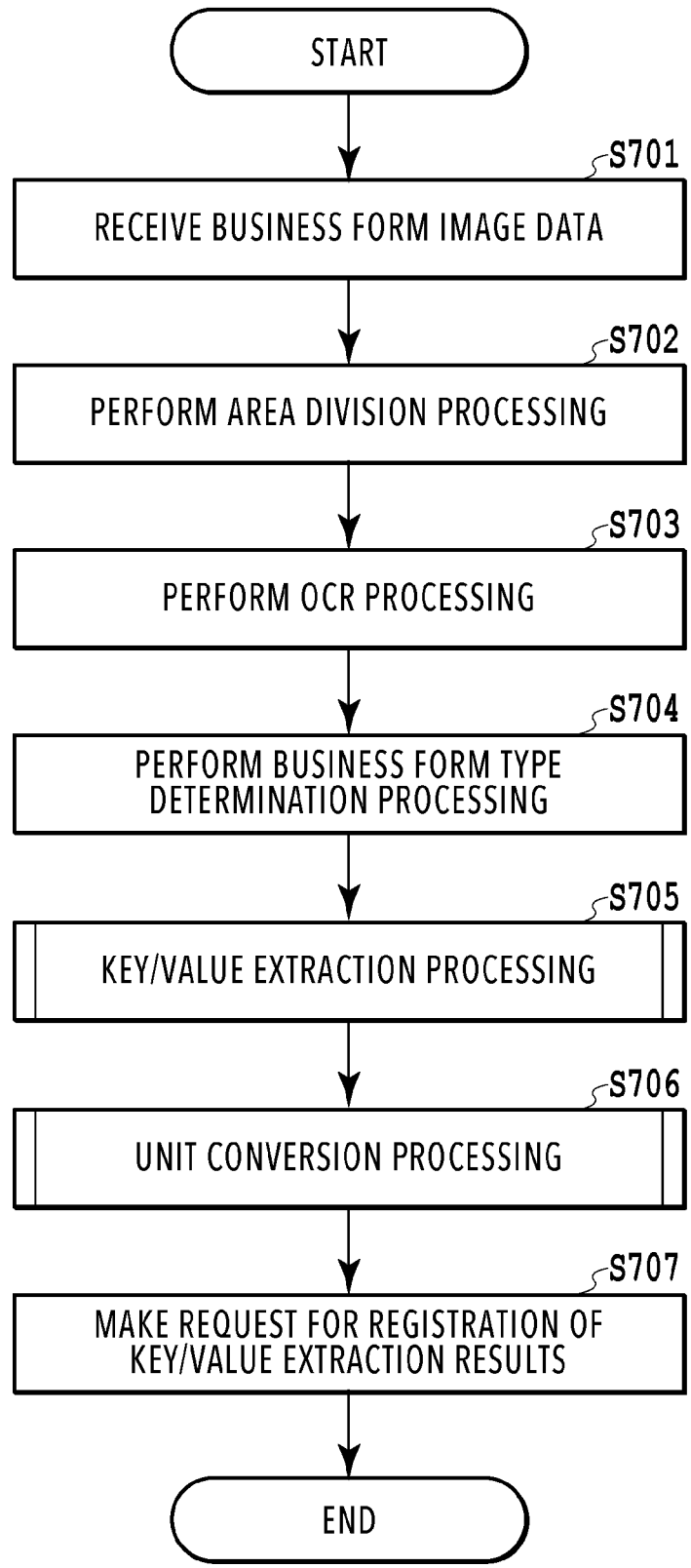
FIG. 7 is a flowchart showing a rough flow of image analysis processing.

Following the above, image analysis processing in the image analysis server 120 is explained in detail. FIG. 7 is a flowchart showing a rough flow of the image analysis processing. The series of processing shown in the flowchart in FIG. 7 is implemented by the CPU 311 reading a predetermined control program from the HDD 314 or the like, loading the program onto the RAM 313, and executing the program. In the following explanation, symbol "S" represents a step.

At S701, the communication unit 401 receives business form image data that is sent from the MFP 110 along with an analysis request by using the network I/F 315. In the analysis request, information relating to a registration destination of image analysis results is also included. Here, it is assumed that data on a business form image 800 shown in FIG. 8 is received along with an analysis request specifying the bill DB server 130a as a registration destination.

At S702 that follows, the area division unit 402 performs area division processing to divide the business form image data received at S701 into block areas in units of objects. Then, at S703, the OCR unit 403 performs OCR processing based on results of the area division processing. Further, at S704, the business form type determination unit 404 performs the type determination processing described previously based on the character recognition results obtained by the OCR processing and specifies type of the business form relating to the business form image. Here, it is assumed that the type of the business form of the business form image 800 is specified as "Bill" in accordance with the character string "Bill" that is the character recognition results in a rectangular area 801 that seems to be an area in which a tile is described.

Next, at S705, the value extraction unit 405 performs processing to extract each character string corresponding to the key and the value in accordance with the type of the business form for the business form image. At this time, extraction of a character string corresponding to the unit of the key (that is, value) is also performed. Details of the key/value extraction processing will be described later.

Then, at S706, the unit conversion unit 406 performs unit conversion processing to make the same the unit format as needed for the character string indicating the unit obtained in the key/value extraction processing. For example, in a case where "yen" is extracted as the character string indicating the unit of the target key "Total", it is assumed that the unit notation at the time of registration in the bill DB server 130a, which is the registration destination, is "thousand yen". In this case, after changing the unit notation to "thousand yen", processing to change the numerical value as the value to a value so as to match with the changed unit notation is performed. Details of the unit conversion processing will be described later.

Lastly, at S707, the DB server management unit 407 performs request processing for registering the results of the key/value extraction processing, for which the unit conversion processing has been performed as needed, in the target server apparatus 130. In a case of the present embodiment, to the bill DB server 130a or the medical certificate DB server 130b, corresponding to the processing-target business form image, the data on the business form image and the results of the key/value extraction processing are transmitted along with the registration request. Here, in a case where the unit conversion processing has been performed so as to be adapted to the rule of the registration destination, it may also be possible to omit the transmission of the data on the character string indicating the unit. Further, in a case where the character string indicating the value has been changed, in addition to the change of the unit notation in the unit conversion processing, in addition to the extraction results after the unit conversion, the extraction results before the unit conversion are also transmitted. After the transmission, this flow is terminated.

The above is the rough contents of the image analysis processing. In the bill DB server 130a or the medical certificate DB server 130b, having received the registration request, the extraction results are registered in association with the business form image, but at that time, the extraction results before the conversion are also registered together. It is possible for a user to check whether there is an error in the registered contents by accessing the registration-destination server apparatus 130 and comparing the business form image and its extraction results. However, in a case where the numerical value of the value extracted from the business form image is registered after changing the numerical value, the numerical value on the business form image and the registered numerical value do not coincide completely with each other. In this regard, in a case where the extraction results before the conversion are also registered, it is made possible to perform the check work of the registered contents without any problem.

<Key/Value Extraction Processing>

Next, details of the key/value extraction processing (S705) in the value extraction unit 405 are explained with reference to the flowchart in FIG. 9.

First, at S901, based on the results of the type determination processing for the processing-target business form image, key information in accordance with the type of the business form is acquired. Specifically, information on the character string to be extracted as the key, which is associated with the type of the business form specified by the type determination processing, is acquired from the key definition table 408 described previously. For example, it is assumed that the type of the business form is "Bill". In this case, in accordance with the key definition table in FIG. 5 described previously, two of "Date of issuance" and "Total" described in "Target key" are acquired as key information.

Next, at S902, in accordance with the key information acquired at S901, each character string of the key and the value is extracted from the character recognition results for the processing-target business form image. In a case of the business form image 800 in FIG. 8 described previously, first, from rectangular areas 802 and 803 including two character strings indicated by the key information, character strings of "Date of issuance" and "Total" are extracted, respectively. Further, from a rectangular area 804, a character sting of "2017/8/28" is extracted as the value of "Date of issuance" and from a rectangular area 805, a character string of "1,188,000" is extracted as the value of "Total". The extraction results of the key and the value thus obtained are stored in the RAM 313.

In a case where the extraction of each character string of the key and the value is completed, at S903, for the key of interest among the extracted keys, whether the unit is defined is determined by referring to the above-described key definition table. In a case where "Default unit" of the key definition table is blank, the key of interest has no unit, and therefore, unit extraction is not necessary. For example, as regards "Date of issuance" for which no unit exists, in the key definition table in FIG. 5 described previously, "Default unit" is blank. In this case, the processing advances to S911, and the next key is taken as the key of interest and the processing is continued. On the other hand, in a case where the key of interest has a unit, in the processing at S904 and the subsequent steps, processing to extract a character string indicating the unit of the key of interest is performed.

First, at S904, based on the extraction results at S902, whether a character string indicating a unit is included within the area including the character string of the value corresponding to the key of interest in the processing-target business form image is determined. Here, the area (hereinafter, described as "value area" including a character string indicating the value is the rectangular areas 804 and 805 in the example of the business form image 800 in FIG. 8 described previously. In a case where the key of interest is "Total", in the rectangular area 805, which is the value area thereof, "¥" that is the character string indicating the unit of "Total" exists at the top thereof. In this case, it is determined that the character string indicating the unit is included within the value area. In a case where the results of the determination such as this indicate that the character string indicating the unit is included within the value area, the processing advances to S905 and in a case where such a character string is not included, the processing advances to S906.

Then, at S905, the character string indicating the unit is searched for and extracted from within the value area. For example, as regards the target key "Total", in addition to "yen" that is "Default unit", the character strings of "¥" and "JPY" defined in "Unit variation" are also searched for and the character strings that coincide with (or that include) "yen", "¥", and "JPY" are extracted. Information on the extracted character strings indicating the unit is saved in the RAM 313. After the extraction of the character string of the unit, the processing advances to S911.

At S906, based on the extraction results at S902, whether a character string indicating a unit is included within the area including the character string indicating the key of interest in the processing-target business form image is determined. FIG. 10A shows an example of a case where a character string indicating a unit is included within the area (hereinafter, described as "key area") including the character string indicating the key of interest. In the example in FIG. 10A, in a case where the key of interest is "White count", "thousand/µl" that is the character string indicating the unit thereof exists within the same cell (minimum unit area at the time of area division). In such a case, it is determined that the character string indicating the unit is included within the key area. In a case where the results of the determination such as this indicate that the character string indicating the unit is included within the key area, the processing advances to S907 and in a case where such a character string is not included, the processing advances to S908. Then, at S907, by the same method as that at S905, the character string indicating the unit is extracted from within the key area.

At S908, whether a character string indicating a unit is included within a neighboring area of the key area and the value area described above is determined. Here, the neighboring area is an area among a plurality of areas obtained by the area division processing, which satisfies predetermined conditions for the key area or the value area. As predetermined conditions, mention is made of that the area is located within a predetermined distance from the key area or the value area, that the area is located at the same height (y-coordinate) as that of the key area or the value area, that the area belongs to the same table object, and so on. FIG. 10B shows an example of a case where a character string indicating a unit is included within the neighboring area of the key area and the value area. In the example in FIG. 10B, it is assumed that the key of interest is "Sales volume" and the value thereof is "100,000". In this case, "thousand yen", which is the character string indicating the unit thereof, exists on the upper right of the whole of the table object. In the case such as this, it is determined that the character string indicating the unit is included within the key area. In a case where the character string indicating the unit is included within the neighboring area, the processing advances to S909 and in a case where such a character string is not included, the processing advances to S910.

At S910, it is determined that the extraction of the character string indicating the unit of the key of interest has failed. In a case where the extraction error of the unit character string has occurred as described above, the processing advances to S911. Then, at S911, whether there exists an unprocessed key in the processing-target business form image is determined. In a case where there exists an unprocessed key, the processing returns to S903, and the next key is taken as the key of interest and the processing is continued. On the other hand, in a case where the processing of all the keys is completed for the processing-target business form image, this flow is terminated.

The above is the contents of the key/value extraction processing according to the present embodiment. FIG. 11 shows the data structure of a table (hereinafter, called "extraction results table") in which the results of the key/value extraction processing for the business form image 800 shown in FIG. 8 are stored. The extraction results table in FIG. 11 includes "ID", "Business form type", "Target key", "Extraction results (key)", "Extraction results (value)", and "Extraction results (unit)". "ID" is an identifier uniquely identifying a combination of the processing-target business form and the target key and in a case of the key within the same business form, the top four figures are the same number (here, "0001"). "Business form type" and "Target key" correspond to "Business form type" and "Target key" respectively in the key definition table shown in FIG. 5. In "Extraction results (key)", the character string corresponding to the target key actually extracted from the processing-target business form (here, "Date of issuance" and "Total") is stored. In "Extraction results (value)", the extracted character string of the value forming a relationship of a pair with "Extraction results (key)" (here, "2017/8/28" and "1,188,000") is stored. In "Extraction results (unit)", the extracted string (here, "¥") indicating, in a case where a unit exists for the target key (here, "Total"), the unit is stored. In a case where "Extraction results (unit)" is blank, this indicates that the target key does not have a unit, or that the extraction of a unit has failed.

<Unit Conversion Processing>

Next, details of the unit conversion processing (S706) in the unit conversion unit 406 are explained with reference to the flowchart in FIG. 12.

First, at S1201, for the key extracted at S902 described previously, information (hereinafter, called "unit format information") relating to the format of the unit at the time of registration of the value is acquired. In this unit format information, information on presence/absence of the rule relating to the unit format that the registration destination can handle and contents (adopted unit notation, specification of number of figures) in a case where the rule exists is included. It may be possible to acquire the unit format information by making an enquiry each time to the registration-destination server apparatus 130 (in the present embodiment, the bill DB server 130a or the medical certificate DB server 130b). Alternatively, it may also be possible to acquire the unit format information by reading it from among the information collected in advance and stored within the HDD 314 of the image analysis server 120.

Next, at S1202, based on the unit format information acquired at S1201, whether the rule relating to the unit format of the key of interest among the extracted keys exists and registration with the predetermined unit notation and the number of figures is specified is determined. In a case where no rule exists, that is, registration with any unit format is possible, it is sufficient to register the extraction results as they are and the unit conversion is not necessary, and therefore, this processing is exited. On the other hand, in a case where the rule exists and registration with the predetermined unit format is specified, the processing advances to S1203.

At S1203, whether the character string indicating the unit, which is extracted for the key of interest, is adapted to the above-described rule is determined. In a case where the character string is adapted to the rule, the unit conversion is also not necessary, and therefore, this processing is exited. On the other hand, in a case where the character string is not adapted to the rule, the processing advances to S1204.

At S1204, whether the portion of the character string extracted for the key of interest, which is not adapted to the rule, is only the unit notation is determined. The case where only the unit notation is not adapted to the rule is, for example, a case where the key of interest is "Total" and the extracted character string indicating the unit is "¥", but the unit notation determined by the rule is "yen". In contrast to this, in a case where the extracted character string indicating the unit is "thousand yen", it is not sufficient only to change the unit notation from "yen" to "thousand yen", and it is necessary to change, for example, the value of the extracted character string from "1000" to "1". In a case where the results of the determination indicate that only the unit notation is not adapted to the rule, the processing advances to S1205 and in a case where only the change of the unit notation does not cause the character string to be adapted to the rule, the processing advances to S1206.

At S1205, for the value, the use of the extraction results as they are does not cause any problem, and therefore, processing to convert only the notation of the extracted character string indicating the unit so as to cause the character string to be adapted to the rule is performed without performing anything for the extracted character string indicating the value. On the other hand, at S1206, processing to convert the notation of the extracted character string indicating the unit and/or the character string indicating the value so as to cause the character string(s) to be adapted to the rule is performed. Here, in a case where the character string of the value is converted, the conversion table in FIG. 6 described previously is used.

Then, at S1207, whether an unprocessed key exists in the processing-target business form image is determined. In a case where an unprocessed key exists, the processing returns to S1202, and the next key is taken as the key of interest and the processing is continued. On the other hand, in a case where the processing of all the keys in the processing-target business form image is completed, this flow is terminated.

Figure 13:
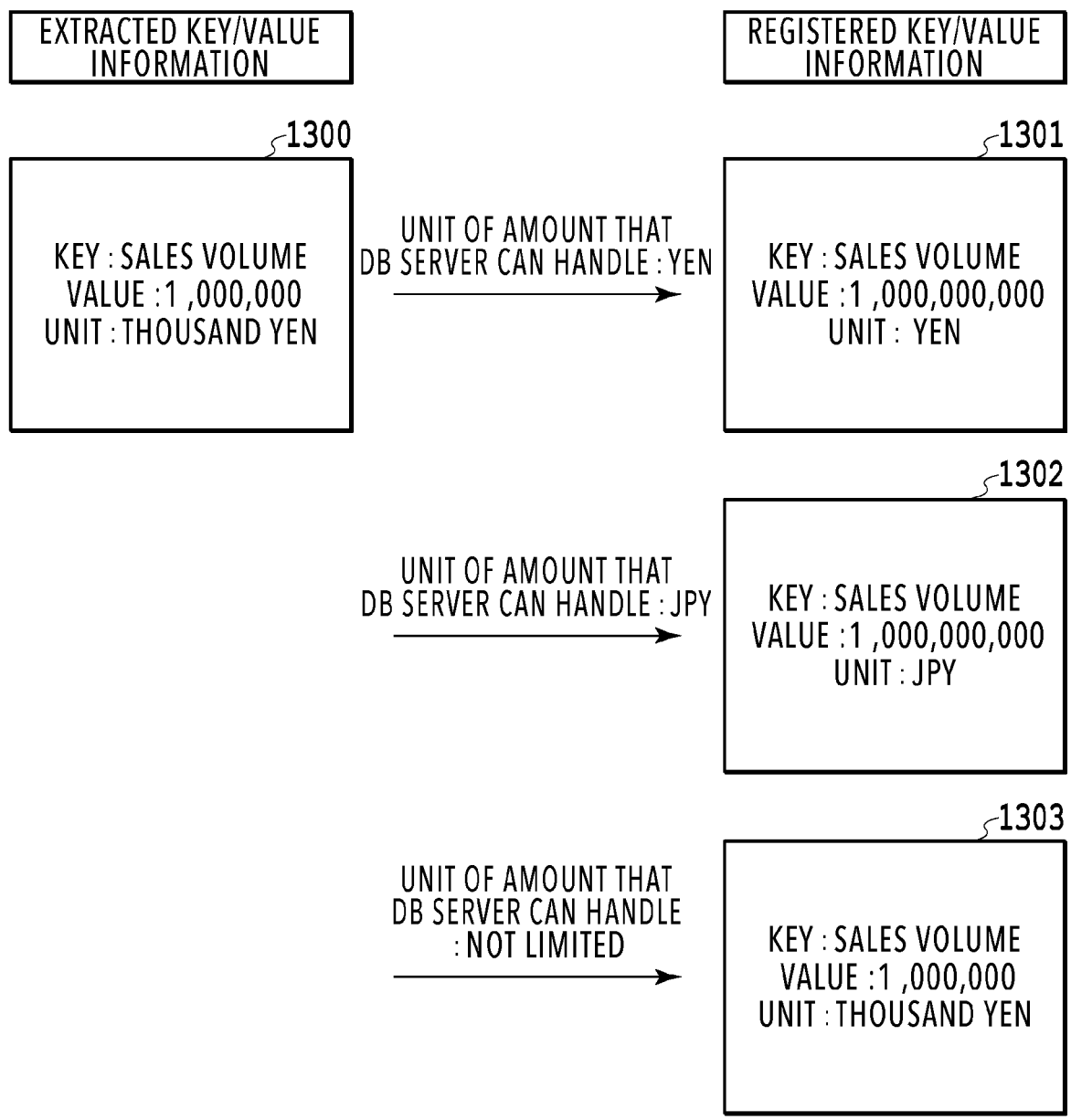
FIG. 13 is a diagram explaining the way registration results change by the unit conversion processing.

The above is the contents of the unit conversion processing. The way the registration results in the server apparatus 130 change due to the unit conversion processing such as this is explained with reference to FIG. 13. In the example in FIG. 13, explanation is given by taking a case as an example where the key/value extraction processing is performed for the business form image shown in FIG. 10B described previously and extraction results 1300 thereof are registered in a DB server, not shown schematically. Here, the extraction results 1300 indicate that as the character string indicating the key, "Sales volume", as the character string indicating the value, "100,000", and as the character string, "thousand yen" are extracted respectively.

First, registration results 1301 are a case where the unit format that the DB server can handle is specified to "yen" for the target key "Sales volume". This case indicates that not only the unit notation is non-adapted, and therefore, after converting both the unit notation and the character string indicting the value at S1206 described above, registration is performed. In this case, by the conversion table in FIG. 6 described previously, first, the unit notation is converted from "thousand yen" into "yen". Further, for the character string indicating the value, the corresponding "Coefficient" is "1000", and therefore, "100,000" is converted into "100,000,000" obtained by multiplying the extracted character string "100,000" indicating the value by 1000.

Next, registration results 1302 are a case where the unit format that the DB server can handle is specified to "JPY" for the target key "Sales volume". This case also indicates that not only the unit notation is non-adapted, and therefore, after converting both the unit notation and the character string indicting the value at S1206 described above, registration is performed. In this case, by the conversion table in FIG. 6 described previously, first, the unit notation is converted from "thousand yen" into "JPY". Further, for the character string indicating the value, the corresponding "Coefficient" is "1000", and therefore, "100,000" is converted into "100,000,000" obtained by multiplying the extracted character string "100,000" indicating the value by 1000. Then, registration results 1303 are a case where the unit format that the DB server can handle is not specified in particular for the target key "Sales volume". In this case, registration is possible with an arbitrary unit format, and therefore, the extraction results are registered as they are without the above-described conversion being performed.

Modification Example 1

Figure 9:
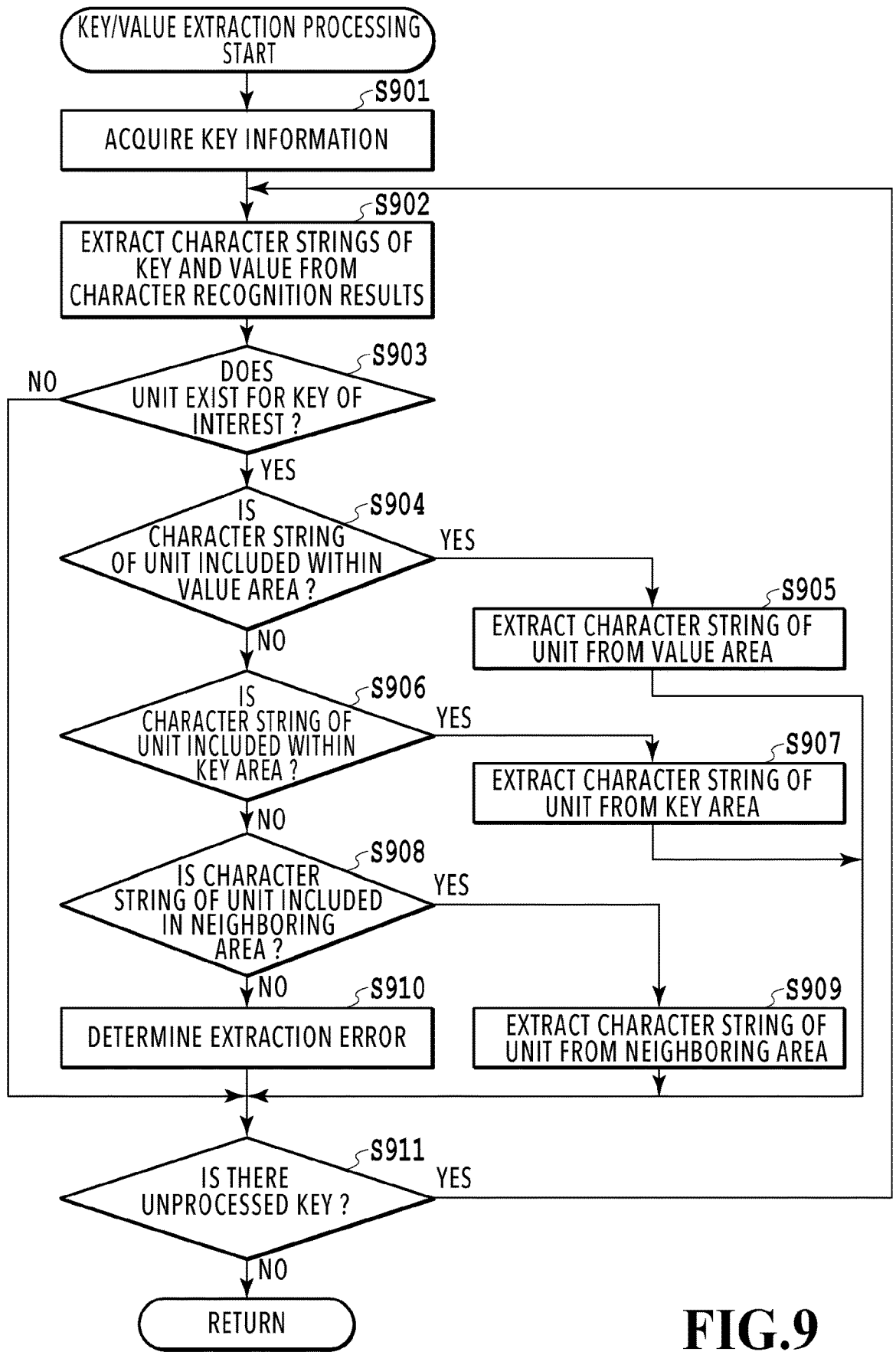
FIG. 9 is a flowchart showing details of key/value extraction processing.

In the key/value extraction processing shown in the flow in FIG. 9, in a case where it is not possible to acquire the character string indicating the unit from the business form image, particular processing is not performed (see S910 described previously). However, this means that the above-described unit conversion processing does not function. Consequently, it may also be possible to perform processing to estimate the unit at S910 in a case where it is not possible to acquire the unit from the business form image. As an estimation method, for example, there is a method of estimating the unit from the character string indicating the value. This method is effective in a case of an item (key) whose standard numerical value range is determined, such as "White count" in the medical examination certificate in FIG. 10A. In this case, it is possible to estimate that the unit is "μl" on a condition that the numerical value has four figures or that the unit is "thousand/μl" on a condition that the numerical value has one figure. In addition to this, for a business form including a plurality of pages, there is a case where it is possible to perform estimation from another page. For example, there is a case where the unit is described on the first page, but not described on the second page. In this case, first, whether another page exists in the business form image for which the extraction of the character string indicating the unit has failed is checked. Then, in a case where another page exists, whether the character string of the target key for which the extraction of the character string of the unit has failed exists on the other page is checked and on a condition that the character string exits, the character string of the unit is extracted by performing the processing at S904 and the subsequent steps described previously. It may also be possible to acquire the character string indicating the unit by estimation by the processing such s this. Further, in a case where it is not possible to perform the estimation as described above, it may also be possible to read the contents defined in "Default unit" of the key definition table described previously and regard it as the character string indicating the unit. Then, it may also be possible to notify a user that the estimation as described above has been performed.

Modification Example 2

Figure 12:
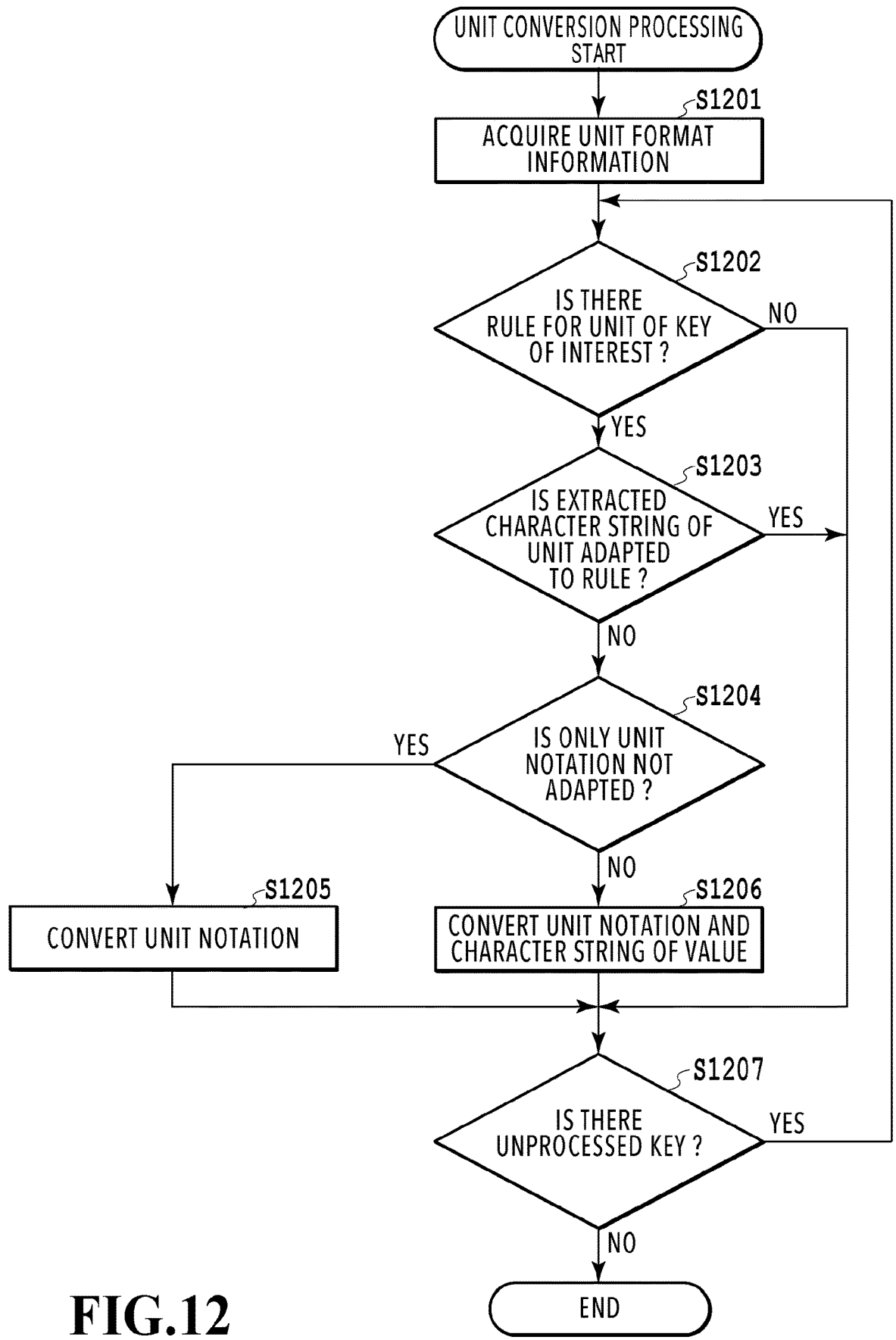
FIG. 12 is a flowchart showing details of unit conversion processing.

In the unit conversion processing shown in FIG. 12, in a case where the rule relating to the unit format is not determined in the registration destination (No at S1202), the unit conversion is not performed for the extraction results of any business form image. In this case, it may happen that registration is performed without making the same the unit of the value corresponding to the same key between business forms of the same type. Then, in a use case where it is desired to manage the change of the medical examination results by registering the medical examination certificate in a time series for each user, it is hard to compare the changes or the like on a condition that the unit is not made the same. Further, in a use case where it is desired to calculate the total amount by registering the data on the receipt or the bill in units of companies or in units of departments, it is not possible to perform the totalization work on a condition that the unit is not made the same. Consequently, in a case where the rule relating to the unit format is not determined in the registration destination and registration is performed in the folder of a specific category in which the extraction results of the business form image of the same type are already stored/registered, it may also be possible to make the unit format the same as that already registered. In this case, it is sufficient to additionally perform the processing as follows in the flow in FIG. 12 described previously.

First, in a case where it is determined that the rule relating to the unit format does not exist (No at S1202), next, whether the folder of a specific category in which the extraction results of the business form image of the same type are already registered exists in the registration destination and additional registration therein is performed is determined. This determination is performed by using, for example, the ID information indicating the category of the registration-destination folder, which is included in the analysis request received along with the business form image data. Then, in a case where it is determined that additional registration is performed in the folder of the specific category in which the extraction results of the business form image of the same type are already registered, the extraction results stored in the folder corresponding to the above-described ID information are acquired and the already-registered unit format is specified for each key. Then, it is sufficient to make a registration request for the value corresponding to each key after converting the unit format into the same as the specified unit format. In a case also where a plurality of business form images of the same type is registered in the folder of the same category at the same time, it is sufficient to perform processing in accordance with the present modification example. That is, in a case where the unit format is different between a plurality of business forms, it is sufficient to perform storage/registration in the same folder after converting the unit format so that the unit format becomes the same as that of one of the unit formats.

As above, according to the present embodiment, in a case where the character string indicating the unit, which is extracted from the business form image, is not adapted to the unit format that the registration destination can handle, registration is performed after the extraction results are converted so as to be adapted. Due to this, it is made possible to register the value in the registration destination with the unit being made the same, and therefore, it is made possible to reduce time and effort of a user required for the check/modification work.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, in a case where a value corresponding to a predetermined keyword within a business form is extracted and registered in a management server or the like, it is possible to perform registration with the format of the unit of the value being made the same.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-148523, filed Aug. 13, 2019, which is hereby incorporated by reference wherein in its entirety.

What is claimed is:

1. An image processing apparatus comprising:
at least one memory that stores a program; and
at least one processor that executes the program to perform:
  executing an optical character recognition processing for a business form image generated by optically reading a business form;
  extracting, based on the result of the character recognition processing for the business form image, a first character string indicating a predetermined keyword and a second character string indicating a value corresponding to the predetermined keyword;
  extracting a third character string indicating a unit corresponding to the value,
  wherein the third character string is extracted from a value area including the second character string in a case where the value area includes the third character string, and
  wherein the third character string is extracted from a key area including the first character string in a case where the key area includes the third character string, and
  wherein the third character string is extracted from a neighboring area of a table object, that includes the first character string and the second character string, in the business form image in a case where the neighboring area includes the third character string;

converting, based on the extracted third character string and a predetermined format which is determined in an external apparatus as a format of a unit of a value corresponding to the predetermined keyword, the extracted second character string indicating the value so as to be adapted to the predetermined format; and outputting the converted second character string to the external apparatus.

2. The image processing apparatus according to claim 1, wherein in a case where a format of a unit of a value corresponding to the predetermined keyword is not determined in the external apparatus, the processor outputs the second character string to the external apparatus without performing the conversion.

3. The image processing apparatus according to claim 1, wherein in a case where it is not possible to extract the third character string from any of the value area, the key area and the neighboring area, the processor estimates the unit corresponding to the value based on the second character string, and further converts, based on the estimated unit, the second character string indicating the value so as to be adapted to the predetermined format.

4. The image processing apparatus according to claim 1, wherein in a case where the business form includes a plurality of pages and on a condition that it is not possible to extract the third character string from a business form image on a certain page, the processor estimates the unit corresponding to the value from a business form image on another page, and further converts, based on the estimated unit, the second character string indicating the value so as to be adapted to the predetermined format.

5. The image processing apparatus according to claim 1, wherein in a case where it is not possible to extract the third character string from the business form image, the processor acquires a unit which is defined in advance as a unit of a value corresponding to the predetermined keyword, and further converts, based on the acquired unit, the second character string indicating the value so as to be adapted to the predetermined format.

6. The image processing apparatus according to claim 1, wherein the processor further specifies a type of the business form image based on the result of the of character recognition processing for the business form image, and wherein the predetermined keyword is determined based on the specified type of business form image.

7. The image processing apparatus according to claim 6, wherein the predetermined keyword is determined based on the specified type of business form image by referring to a table that defines an extraction-target keyword for each type of the business form.

8. A control method of an image processing apparatus that performs an image analysis for a business form image generated by optically reading a business form, the control method comprising the steps of:

executing an optical character recognition processing for a business form image generated by optically reading a business form;

extracting, based on the result of the character recognition processing for the business form image, a first character string indicating a predetermined keyword and a second character string indicating a value corresponding to the predetermined keyword;

extracting a third character string indicating a unit corresponding to the value, wherein the third character string is extracted from a value area including the second character string in a case where the value area includes the third character string, and wherein the third character string is extracted from a key area including the first character string in a case where the key area includes the third character string, and wherein the third character string is extracted from a neighboring area of a table object, that includes the first character string and the second character string, in the business form image in a case where the neighboring area includes the third character string;

converting, based on the extracted third character string and a predetermined format which is determined in an external apparatus as a format of a unit of a value corresponding to the predetermined keyword, the extracted second character string indicating the value so as to be adapted to the predetermined format; and outputting the converted second character string to the external apparatus.

9. A non-transitory computer-readable storage medium storing a program for causing a computer to perform a control method of an image processing apparatus that performs an image analysis for a business form image generated by optically reading a business form, the control method comprising the steps of:

executing an optical character recognition processing for a business form image generated by optically reading a business form;

extracting, based on the result of the character recognition processing for the business form image, a first character string indicating a predetermined keyword and a second character string indicating a value corresponding to the predetermined keyword;

extracting a third character string indicating a unit corresponding to the value, wherein the third character string is extracted from a value area including the second character string in a case where the value area includes the third character string, and wherein the third character string is extracted from a key area including the first character string in a case where the key area includes the third character string, and wherein the third character string is extracted from a neighboring area of a table object, that includes the first character string and the second character string, in the business form image in a case where the neighboring area includes the third character string, converting, based on the extracted third character string and a predetermined format which is determined in an external apparatus as a format of a unit of a value corresponding to the predetermined keyword, the extracted second character string indicating the value so as to be adapted to the predetermined format; and outputting the converted second character string to the external apparatus.

\* \* \* \* \*